Figure 7:
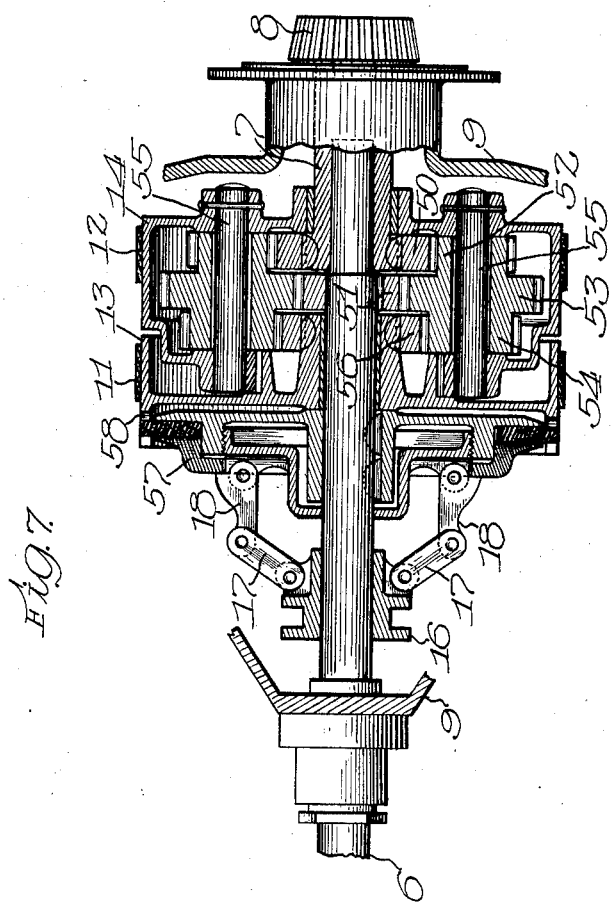

G. W. BULLEY.
TRANSMISSION GEARING.
APPLICATION FILED FEB. 27, 1911.
1,026,073.
Patented May 14, 1912.
3 SHEETS—SHEET 1.
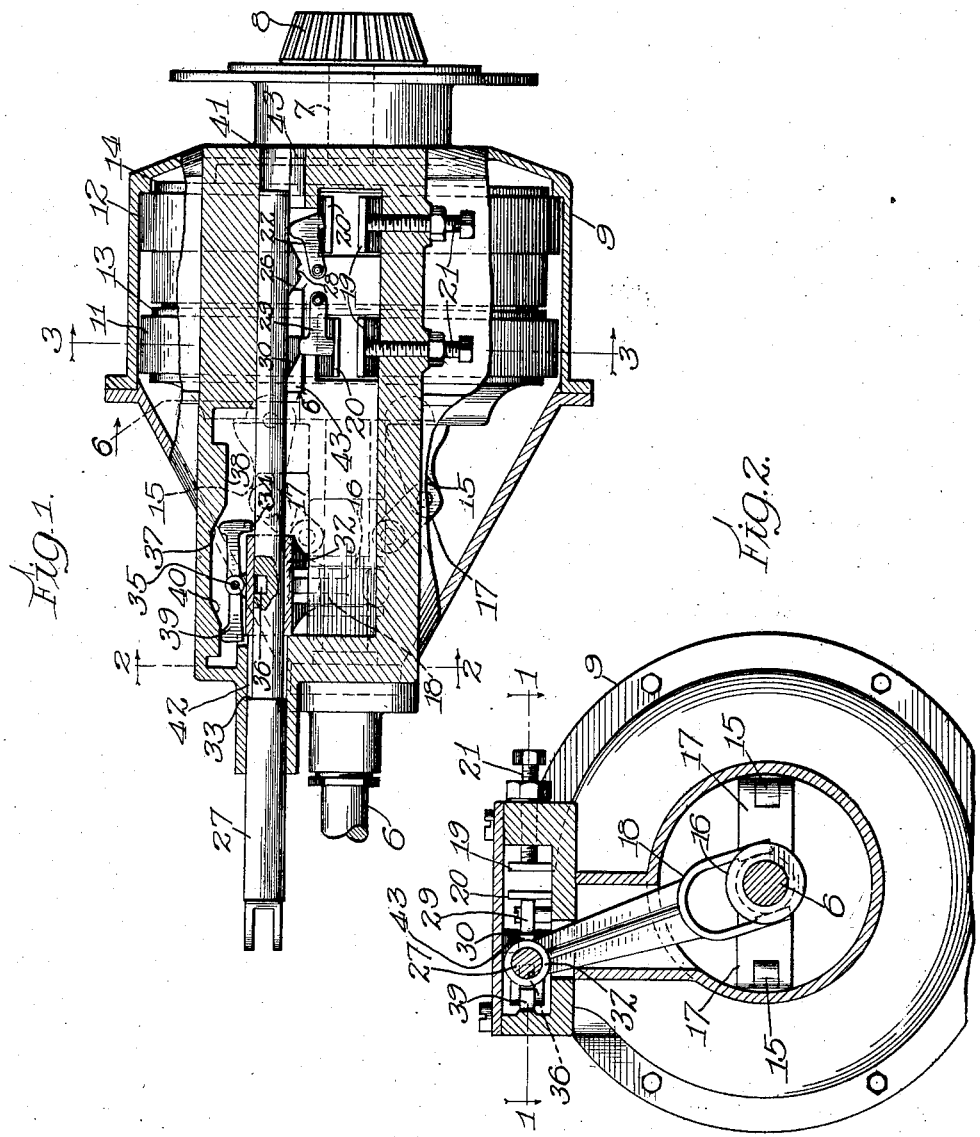

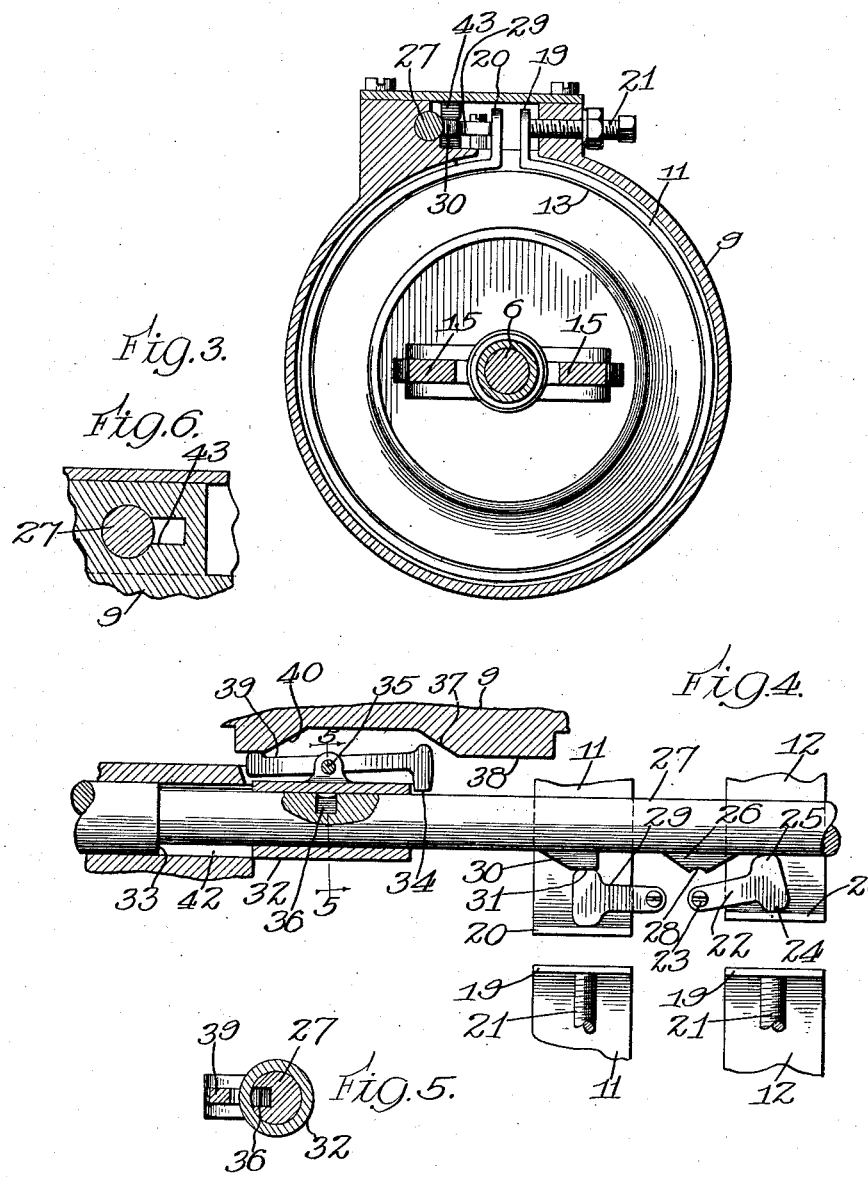

G. W. BULLEY.
TRANSMISSION GEARING.
APPLICATION FILED FEB. 27, 1911.

1,026,073.

Patented May 14, 1912.
3 SHEETS—SHEET 3.

Witnesses:
Inventor:
Geo. W. Bulley

UNITED STATES PATENT OFFICE.

GEORGE W. BULLEY, OF CHICAGO, ILLINOIS, ASSIGNOR TO HOLSMAN EQUIPMENT COMPANY, OF CHICAGO, ILLINOIS, A CORPORATION OF ILLINOIS.

TRANSMISSION-GEARING.

1,026,073.          Specification of Letters Patent.          Patented May 14, 1912.

Application filed February 27, 1911. Serial No. 611,249.

*To all whom it may concern:*

Be it known that I, GEORGE W. BULLEY, a citizen of the United States, residing at Chicago, in the county of Cook and State of Illinois, have invented certain new and useful Improvements in Transmission-Gearing, of which the following is a full, clear, and exact specification.

This invention relates generally to power transmitters also known as transmission gearing, and more particularly to the speed changing mechanism, and mechanism for changing the direction of drive employed in connection with such gearing.

In some types of transmission gearing, one or more gear wheels are shifted from one position to another to effect the change of speed or the direction of drive; in others these results are accomplished by tightening some suitable form of clutching or gripping device which renders active certain gears or elements of the transmission mechanism which have to do with the particular speed or direction of drive desired. This invention relates more particularly to the latter class. In some species under this class the clutching or gripping means consists of a clutch which connects a driving element to a driven element (as for example, a normally loose gear to its shaft which is continually driven). In others, more commonly belonging to the planetary type, a friction grip or band serves to hold one gear of a train from revolving bodily, thereby causing it to rotate on its own axis and impart rotation to other gears of the train, as well understood in this art. As an instance of the many adaptations of which the invention is susceptible, it has been shown in this application as applied to the last named species of clutching or gripping means.

The invention has for its primary object to provide an improved transmission gearing in which the various clutching or gripping means for changing the speed or the direction of drive may be under the control of a single element whereby its mode of operation will be comparatively simplified.

Other objects of the invention will appear from the following specification and the accompanying drawings illustrating an example of the invention, which is particularly pointed out in the claims.

In the said drawings—Figure 1 is a plan section of a transmission gearing embodying this invention, taken on the line 1—1 Fig. 2. Fig. 2 is a transverse section thereof taken on the line 2—2 Fig. 1. Fig. 3 is a transverse section taken on the line 3—3 Fig. 1. Fig. 4 is an enlarged detail view in plan section of certain parts hereinafter described. Fig. 5 is a transverse section on the line 5—5 Fig. 4. Fig. 6 is an enlarged detail cross section taken on line 6—6 Fig. 1. Fig. 7 is a central plan sectional view of the speed changing and reversing mechanism, the controlling parts being removed and the casing broken away.

6 is the driving shaft, 7 the driven shaft which may have any suitable means of transmitting its motion to the work, as, for example, a gear wheel 8, 9 the casing, and 11 and 12 the friction bands or clutching bands of an ordinary planetary transmission gearing, all of which may be of the usual or any suitable construction. It is customary in transmission gearing of this type to provide the same with instrumentalities whereby the rotation of the driving shaft 6 will be imparted to the driven shaft 7, either directly when clutch elements connected respectively with the driving and driven shafts are locked together, or indirectly through a train or through one of a plurality of separate trains of gears capable of imparting different speeds to the driven shaft 7 from the constant-speed drive-shaft 6 when one or the other of the clutch bands or gripping bands 11, 12, is tightened on the drum 13, or 14, which it surrounds.

In the drawings I have illustrated a form of clutch for establishing direct connection between the drive shaft 6 and driven shaft 7, but any suitable form of clutch well known in this art may be employed. In some forms the clutch members are operated by pivoted levers, such as the levers 15 connected to a sliding collar 16 on the driveshaft 6 by any suitable means, such as links 17, so that when the collar is pushed in one direction on the shaft, the clutch will be applied or locked, and when moved in the opposite direction, it will be released. The mechanism which I have illustrated is of this type. The collar is usually operated in the described manner by a shifter 18, which may be of the usual or any suitable form, but in the mechanism shown the means for operating the shifter constitutes a part of this invention and will be presently described.

Referring more particularly to Fig. 7, it will be seen that within the gear housing 9, the driving shaft 6 is reduced in diameter and, carried on this reduced portion, is an independent sleeve which in this structure constitutes the driven shaft 7. The inner end of the sleeve shaft 7 carries a pinion 50 and adjacent this pinion 50, is another pinion 57 of smaller diameter keyed to the shaft 6. These two pinions are constantly in mesh with a plurality of groups of planetary gears. These groups of gears are each composed of three different diametered pinions 52, 53 and 54, all integrally connected together and mounted on respective shafts 55 which are journaled in the rotatable drum 14. The gears 52 and 53 of these planetary groups mesh with the shaft pinions 50 and 51 respectively, and gears 54 mesh with pinion 56 carried on the hub of the rotatable reversing drum 13. This structure is designed for two speeds forward and one reverse, and as before stated, these speed changes are brought about by the clutch or gripping bands 11 and 12. It will thus be seen that by moving or actuating the band 12 and thereby holding the drum 14 against rotation, the shaft 6 will drive shaft 7 in the same direction through the medium of the gears 51, 53, 52 and 50, but at a slower speed on account of the different diameters of the pinions. The reverse speed is, as is clearly seen, accomplished by actuating the band 11 to hold drum 13 against rotation (drum 14 being released and free to rotate). In this case the gear 56 is held stationary, and the planetary pinions are, as is well understood, caused to rotate bodily in reverse directions to that of shaft 6 and thereby drive shaft 7 in a corresponding reverse direction, the speed of reverse rotation of shaft 7 corresponding to the difference between the speed imparted to the planetary pinions by the gears 56 and the shaft pinion 51. In order to drive the shaft 7 at the same speed forward as the drive shaft 6, the clutch previously referred to is used. In this structure a rotatable disk 57 is mounted on the shaft 6 adjacent the drum 11 and has peripheral teeth or lugs 58 adapted to engage with corresponding teeth on the periphery of drum 11. When the disk 57 is shifted into engagement with drum 11 by the collar 16, links 17, and shifter 18 heretofore mentioned, it locks all of the rotatable parts to the shafts 6 and 7.

The grip or clutch bands 11, 12 are ordinarily provided with lugs 19, 20, at their extremities arranged sufficiently apart to permit of radial expansion and contraction of the band. One of these lugs, the lug 19, is adjustably held in position by an adjusting screw or stop 21 passing through a part of the casing and having its inner end arranged in position to be impinged by the lug 19. The opposite lug 20 is the one which is acted upon to cause the band to contract on its drum. For each speed-change one of these bands is usually required. In this example of the invention, the device as above mentioned is adapted for but one speed-change, that is, for but one speed less than direct drive or high speed, and a separate band is required in devices of this character for the reverse. Consequently, in this exemplification of the invention, one of the bands 11, 12 when tightened, reverses in the driven shaft 7 the direction of motion received from the driving shaft 6, the band 11 being the reversing band and being substantially the same in construction and operation as the speed-change band 12. The means for tightening either of these bands 11, 12 at will constitute a part of this invention, and will now be described.

Arranged adjacent the lug 20 of the low-speed band 12 is a dog 22. This is movable with the lug 20 and is held in place in any suitable way, as by means of a pivot pin or screw 23 serving to hold the dog on a part of the casing while permitting it to move back and forth with the lug 20. The dog is provided on one side with a rounded bearing 24 which enables it to work against the lug 20 without undue friction, and on the other side it has a rounded end or bearing 25 with which engages a cam or incline 26 secured to a sliding rod 27 and so constructed, proportioned and arranged that when it engages the end 25 of the dog 22, the dog will be forced over against the lug 20 and the low-speed band 12 will be thereby applied or gripped to its drum 14. The rod 27 is under the control of the operator by any suitable means applied to the outer ends of the rod, not necessary to illustrate, and in order that the operator may be able to determine when the incline 26 has reached the limit of its wedging action, its apex is provided with a seat or notch 28 into which the rounded end 25 of the dog is adapted to snap when the two are in register, the dog being continually urged toward the incline 26 by the elasticity of the band 12, as will be understood.

Arranged adjacent to the outer side of the lug 20 of the reverse band 11 is a dog 29 similar in construction and its mode of support to the dog 22, excepting that its outer end need not be rounded in the same way or for the same purpose described with reference to the outer end of the dog 22. The dog 29, however, acts upon the lug 20 of band 11 in the same manner as dog 22 acts upon the lug of band 12, and when crowded toward the companion lug 19 of this band 11, causes the latter to grip its drum 13 and thereby cause the shaft 7 to rotate in a direction opposite that in which the shaft 6 rotates. On the sliding rod 27 is a second incline cam or wedge 30 arranged to engage the dog 29 at times when the incline 26 is out of engagement with the dog 22, and the direct drive clutch is released. In order that the incline 30 may maintain its position of engagement with relation to the dog 29, it may, if desired, be provided with a straight face 31 arranged parallel with the rod 27, so that when in engagement with the dog, the pressure of the latter against the incline 30 will not tend to move the rod longitudinally. This same rod 27 is utilized as a means for controlling the clutch shifter 18 whereby the clutch for connecting the driving shaft 6 directly with the driven shaft 7 may be applied or released at the will of the operator by simply shifting the rod longitudinally in the proper direction. The upper end of the shifter 18 is provided with a collar 32 which is arranged loosely on the rod 27, and carries means for locking itself to the rod 27 after the rod has been pushed a certain distance longitudinally for releasing both of the bands 11, 12. With the parts in the position shown in the drawings, the reverse band is applied, but when the transmission mechanism is entirely out of action, with the driving shaft entirely disconnected from the driven shaft, the incline 30 will occupy a position to the right of the dog 29, while the incline 26 will assume a position slightly to the left of the dog 22. In order to connect the driving shaft directly with the driven shaft, it is of course desirable to first pass through the low speed position. If, therefore, the movement of the rod 27 be continued toward the right, in order to shift the collar 32 and apply the direct speed-clutch, the incline 26 will first encounter the dog 22 and apply the low speed band 12, and then, as it passes on beyond the dog 22, a means for moving the collar 32 with the rod 27 becomes effective. In the exemplification of the invention shown in the drawings, such a means consists of a simple shoulder 33 formed on the rod 27 as a result of having one end of the rod larger than the other. This shoulder 33 is so positioned with relation to the inclines 26, 30, that by the time the incline 26 passes beyond the dog 22, going toward the right, such shoulder will come in contact with the end of the collar 32 and push the collar, together with the shifter 18, until the direct speed clutch is applied. The means before referred to for establishing an operative connection between the collar 32 and the rod 27 is utilized for releasing the high speed clutch or compelling the collar 32 to return with the rod 27 when the latter is moved toward the left. A suitable device for the purpose consists of a dog 34 which is pivotally mounted by pivot 35 upon the collar 32, so as to move therewith, and is arranged to engage in a notch 36 formed in the rod 27 when the latter is pushed the necessary distance for carrying the incline 26 beyond the dog 22 toward the right. The dog 34 is caused to enter the notch 36 by a cam or incline 37 formed on the main casing when the shoulder 33 engages the collar 32 and moves the dog 34 into engagement with the incline 37. The dog 34 is held in the notch 36 during the further movement of the rod 27 toward the right by engaging a surface 38 on the casing arranged parallel with the rod, and consequently when the reverse pull is imparted to the rod 27, it being desired to release the direct speed clutch, the dog 34 will compel the collar 32 to follow with the rod and to remain attached thereto until the incline 7 is again reached, whereupon the tail piece 39 on the dog 34 will encounter a second incline 40 on the casing and positively release the dog 34 from the notch 36, thereby permitting the notch to recede within the collar and allowing the rod 27 its necessary freedom of movement for operating either of the dogs 22, 29 without disturbing the collar 32, it being understood, of course, that the parts are so proportioned and arranged that before the incline 26 engages the dog 22 when moving toward the left, the direct speed clutch will have been released by the movement of the collar 32 toward the left. It will also be observed that the dog 34 constitutes a stop or lock for positively holding the collar 32 against longitudinal movement with the rod 27 until the shoulder 33 engages with the collar and the dog has been forced into place in the notch 36, because the dog 34 is incapable of passing the incline 37 until the notch 36 registers therewith, consequently danger of applying the direct speed clutch while one of the bands 11, 12, is applied, is avoided.

The rod 27 is slidably mounted in guide passages 41, 42, formed in the casing and made of any desired shape in cross section suited to its sliding action. It is, of course, desirable, however, that it be held against rotation to prevent the inclines 26, 30 from getting out of line with their respective dogs, and consequently, when the rod is cylindrical, like the example shown in the drawing, these inclines may be utilized as a means of holding the rod against rotation by so forming and situating them that one of them will always occupy the slot 43 provided for their movement along the side of the guide passage 41.

What I claim is:

1. In a device of the class described, the combination of a driving shaft, a driven shaft, mechanism for transmitting motion from the driving to the driven shaft embodying a plurality of clutching or gripping means each having a movable element which when operated effects connection between said driving and driven shafts, a movable actuating member having means for successively engaging and operating said elements at different points along its path of movement, means for locking one of said elements to said member at a given point along said path of movement, and means for releasing said locking means upon return movement of said actuating member.

2. In a device of the class described, the combination of a driving shaft, a driven shaft, mechanism for transmitting motion from the driving to the driven shaft embodying a plurality of clutching or gripping means each having a movable element which when operated effects connection between the driving and driven shafts, a movable actuating member having means for successively engaging and operating said elements at different points along its path of movement, means for locking one of said elements to said actuating member at a given point along said path of movement, a lock-actuating element arranged to be engaged by a part of said locking means as the latter moves, to thereby lock the locking means, and means for releasing said locking means upon return movement of said actuating member.

3. In a device of the class described, the combination of a driving shaft, a driven shaft, mechanism for transmitting motion from the driving to the driven shaft embodying a plurality of clutching or gripping means each having a movable element which when operated effects connection between the driving and driven shafts, a slidable actuating rod having means for engaging and operating one of said elements at a given point along the path of movement of said rod, and locking means for locking another one of said elements to said rod at another given point along said path of movement, including a locking dog adapted to engage said rod after the latter has moved a given distance with relation to the dog.

4. In a device of the class described, the combination of a driving shaft, a driven shaft, mechanism for transmitting motion from the driving shaft to the driven shaft embodying a plurality of clutching or gripping means each having an element which when operated effects connection between the driving and driven shafts, a sliding actuating rod having means for operating one of said elements at a given point along the line of movement of the rod, a locking dog mounted on another of said elements and movable therewith for locking said element and actuating rod together after the rod is moved a given distance with relation to the latter said element, and a lock actuating means arranged adjacent the line of movement of said dog and adapted to be engaged thereby for actuating the dog to lock the second said element and actuating rod together.

5. In a device of the class described, the combination of a driving shaft, a driven shaft, mechanism for transmitting motion from the driving to the driven shaft embodying a plurality of clutching or gripping means each having an element which when operated effects connection between the driving and driven shafts, a slidable actuating rod having means for operating one of said elements at a given point along the path of movement of said rod, said rod having means for engaging and operating another one of said elements after moving a given distance with relation thereto, a dog movable with the latter said element, said rod having a notch for the engagement of said dog, and means arranged adjacent the line of movement of said dog for forcing the dog into engagement with said notch and thereby locking the dog and rod together.

6. In a device of the class described, the combination of a driving shaft, a driven shaft, mechanism for transmitting motion from the driving to the driven shaft embodying a plurality of clutching or gripping means each having an element which when operated effects connection between the driving and driven shafts, a slidable actuating rod having means for operating one of said elements, a locking dog movable with another of said elements, said rod having means for engaging and operating the latter said element after moving a given distance with relation thereto, said rod also having a notch for the engagement of said dog, means arranged adjacent the line of movement of said dog for forcing it into engagement with said notch and thereby locking the rod and dog together when moved in one direction, and means arranged adjacent the line of movement of the dog in the opposite direction for releasing the dog at a given point along its line of movement.

7. In a device of the class described, the combination of a driving shaft, a driven shaft, mechanism for transmitting motion from the driving to the driven shaft embodying a plurality of clutching or gripping means each having a movable element which when operated effects connection between the driving and driven shafts, a slidable actuating rod having means for operating one of said elements at a given point along its line of movement, said rod passing loosely through another of said elements and having means for engaging and operating the latter said element after moving a given distance with relation thereto, means carried by the last said element for locking the latter and the rod together after the rod has moved a given distance with relation thereto in one direction, and means for releasing said locking means after the rod has moved a given distance in the return direction.

8. In a device of the class described, the combination of a driving shaft, a driven shaft, mechanism for transmitting motion from the driving to the driven shaft embodying a plurality of clutching or gripping means each having a movable element which when moved effects connection between the driving and driven shafts, a slidable actuating rod having means for moving one of said elements, another of said elements being in the form of a collar through which said rod passes and is slidable a given distance with relation thereto, said actuating rod having a shoulder for engaging and moving said collar, and also having a notch, a dog mounted on said collar for engaging said notch when it registers therewith, and an incline arranged adjacent the line of movement of said dog and adapted to be engaged thereby for forcing the dog into engagement with said notch and locking the rod and dog together.

9. In a device of the class described, the combination of a driving shaft, a driven shaft, mechanism for transmitting motion from the driving to the driven shaft embodying a plurality of clutching or gripping means each having a movable element which when moved effects connection between the driving and driven shafts, a slidable actuating rod having means for moving two of said elements at different points along its path of movement and a stop for holding one of said elements against movement until said rod has moved a given distance.

10. In a device of the class described, the combination of a driving shaft, a driven shaft, mechanism for transmitting motion from the driving to the driven shaft embodying a plurality of clutching or gripping means each having a movable element which when moved effects connection between the driving and driven shafts, a slidable actuating rod having means for moving two of said elements at different points along its path of movement and a stop for holding one of said elements against movement until said rod has moved a given distance, including a dog movable with the latter said element and adapted to engage said rod, and an element arranged adjacent the line of movement of said dog and adapted to be engaged thereby and arrest its movement until the rod has moved a given distance.

11. In a device of the class described, the combination of a driving shaft, a driven shaft, mechanism for transmitting motion from the driving to the driven shaft embodying a plurality of clutching or gripping means each having a movable element which when moved effects connection between the driving and driven shafts, a frame or casing having a slotted guide passage, and an actuating rod slidable in said passage and provided with cams or inclines slidable in the slot of said passage for holding said rod against rotation and actuating said movable elements.

In testimony whereof I have signed my name to this specification, in the presence of two subscribing witnesses, on this 23rd day of February, A. D. 1911.

G. W. BULLEY.

Witnesses:
C. H. SEEM,
FRANCIS A. HOPKINS.

---

Copies of this patent may be obtained for five cents each, by addressing the "Commissioner of Patents, Washington, D. C."